(12) United States Patent
Ladnai et al.

(10) Patent No.: US 10,460,105 B2
(45) Date of Patent: *Oct. 29, 2019

(54) ENDPOINT MALWARE DETECTION USING AN EVENT GRAPH

(71) Applicant: Sophos Limited, Abingdon (GB)

(72) Inventors: Beata Ladnai, Cheshire (GB); Mark David Harris, Oxon (GB); Andrew J. Thomas, Oxfordshire (GB); Andrew G. P. Smith, Oxford (GB); Russell Humphries, Surrey (GB)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/924,460

(22) Filed: Mar. 19, 2018

(65) Prior Publication Data

US 2018/0276380 A1 Sep. 27, 2018

Related U.S. Application Data

(63) Continuation of application No. 15/484,830, filed on Apr. 11, 2017, now Pat. No. 9,928,366, which is a
(Continued)

(30) Foreign Application Priority Data

Jun. 17, 2016 (GB) .................................. 1610609.8
Jun. 29, 2016 (GB) .................................. 1611301.1

(51) Int. Cl.
*G06F 21/56* (2013.01)
*G06F 21/55* (2013.01)
*G06F 8/65* (2018.01)

(52) U.S. Cl.
CPC ............ *G06F 21/56* (2013.01); *G06F 21/554* (2013.01); *G06F 8/65* (2013.01); *G06F 2221/034* (2013.01); *G06F 2221/2101* (2013.01)

(58) Field of Classification Search
CPC .. G06F 21/56; G06F 21/554; G06F 2221/034; G06F 8/65; G06F 2221/2101
See application file for complete search history.

(56) References Cited

U.S. PATENT DOCUMENTS

| 5,822,533 A | 10/1998 | Kamibayashi et al. |
| 6,792,456 B1 | 9/2004 | Hellerstein et al. |

(Continued)

FOREIGN PATENT DOCUMENTS

| JP | 2016066282 | 4/2016 |
| WO | WO-2016072310 | 5/2016 |
| WO | WO-WO2017180666 | 10/2017 |

OTHER PUBLICATIONS

Kwon, Bum J. et al., "The Dropper Effect: Insights into Malware Distribution with Downloader Graph Analytics", NPL-120 Oct. 2015, 12 Pages.
(Continued)

*Primary Examiner* — Matthew Smithers
(74) *Attorney, Agent, or Firm* — Strategic Patents, P.C.

(57) ABSTRACT

A data recorder stores endpoint activity on an ongoing basis as sequences of events that causally relate computer objects such as processes and files, and patterns within this event graph can be used to detect the presence of malware on the endpoint. The underlying recording process may be dynamically adjusted in order to vary the amount and location of recording as the security state of the endpoint changes over time.

20 Claims, 6 Drawing Sheets

Related U.S. Application Data continuation-in-part of application No. 15/130,244, filed on Apr. 15, 2016, now Pat. No. 9,967,267.

(56) References Cited

U.S. PATENT DOCUMENTS

| | | | |
|---|---|---|---|
| 7,900,193 B1 * | 3/2011 | Kolawa | G06F 11/3604 717/126 |
| 7,904,962 B1 * | 3/2011 | Jajodia | H04L 63/1425 709/223 |
| 8,316,438 B1 | 11/2012 | Bush et al. | |
| 8,347,392 B2 | 1/2013 | Chess et al. | |
| 8,555,269 B2 | 10/2013 | Huang et al. | |
| 8,688,701 B2 | 4/2014 | Ghosh et al. | |
| 8,719,924 B1 | 5/2014 | Williamson et al. | |
| 8,949,994 B2 | 2/2015 | Amit et al. | |
| 8,959,643 B1 | 2/2015 | Invernizzi et al. | |
| 9,148,441 B1 | 9/2015 | Tamersoy et al. | |
| 9,166,997 B1 | 10/2015 | Guo et al. | |
| 9,203,861 B2 * | 12/2015 | Albanese | H04L 63/1433 |
| 9,225,730 B1 | 12/2015 | Brezinski | |
| 9,256,739 B1 | 2/2016 | Roundy et al. | |
| 9,262,294 B2 | 2/2016 | Gupta et al. | |
| 9,413,773 B2 | 8/2016 | Amit et al. | |
| 9,628,506 B1 | 4/2017 | Han et al. | |
| 9,928,366 B2 * | 3/2018 | Ladnai | G06F 21/56 |
| 9,967,267 B2 * | 5/2018 | Ladnai | H04L 63/1416 |
| 2006/0048025 A1 | 3/2006 | Filipovic | |
| 2006/0075494 A1 | 4/2006 | Bertman et al. | |
| 2007/0143850 A1 * | 6/2007 | Kraemer | G06F 21/55 726/25 |
| 2008/0005555 A1 | 1/2008 | Lotem et al. | |
| 2009/0089040 A1 | 4/2009 | Monastyrsky et al. | |
| 2010/0031358 A1 | 2/2010 | Elovici et al. | |
| 2010/0058456 A1 | 3/2010 | Jajodia et al. | |
| 2010/0100964 A1 | 4/2010 | Mahaffey et al. | |
| 2010/0125909 A1 | 5/2010 | Dai et al. | |
| 2011/0041179 A1 | 2/2011 | St hlberg et al. | |
| 2011/0252032 A1 | 10/2011 | Fitzgerald et al. | |
| 2013/0019309 A1 | 1/2013 | Strayer et al. | |
| 2013/0312101 A1 | 11/2013 | Lotem et al. | |
| 2015/0264062 A1 | 9/2015 | Hagiwara et al. | |
| 2015/0356301 A1 | 12/2015 | Diehl et al. | |
| 2016/0094422 A1 | 3/2016 | Poola et al. | |
| 2016/0105454 A1 | 4/2016 | Li et al. | |
| 2016/0219066 A1 | 7/2016 | Vasseur et al. | |
| 2016/0373481 A1 | 12/2016 | Sultan et al. | |
| 2017/0244733 A1 * | 8/2017 | Wu | H04L 63/1416 |
| 2017/0300690 A1 | 10/2017 | Ladnai | |
| 2017/0302685 A1 | 10/2017 | Ladnai et al. | |
| 2018/0227320 A1 | 8/2018 | Ladnai et al. | |
| 2018/0276379 A1 | 9/2018 | Ladnai et al. | |
| 2019/0258800 A1 | 8/2019 | Ladnai et al. | |

OTHER PUBLICATIONS

Alserhani, et al., "Event-based alert correlation system to detect SQLI activities", IEEE Computer Science NPL-216 2011, pp. 175-182.

Wu, et al., "A Graph Similarity-based Approach to Security Event Analysis Using Correlation Techniques", IEEE NPL-226 2010, 5 pages.

Cheng, et al., "Generating Attack with Causal Relationship", IEEE Computer Society NPL-222 2007, pp. 368-373.

King, et al., "Backtracking Intrusions", AMC Transactions on Computer Systems, vol. 23 NPL-215 Feb. 2005, pp. 51-76.

Pan, et al., "Causal Event Graphs Cyber-physical System Intrusion Dettection System", AMC NPL-224 Oct. 30, 2012, 4 pages.

Feng, et al., "Ptera: An Event-Oriented Model of Computation for Heterogeneous Systems", AMC NPL-223 Oct. 2010, pp. 219-228.

Wang, et al., "A Graph Based Approach Tword Network Forensics Analysis", AMC Transactions on Information and Systems Security, vol. 12, No. 1, Article 4 NPL-217 Oct. 2008, pp. 1-33.

USPTO, "U.S. Appl. No. 15/130,244 Non-Final Office Action dated Oct. 6, 2017", 14 pages.

USPTO, "U.S. Appl. No. 15/130,244 Notice of Allowance dated Feb. 13, 2018", 11 pages.

USPTO, "U.S. Appl. No. 15/484,830 Non-Final Office Action dated Oct. 6, 2017", 11 pages.

USPTO, "U.S. Appl. No. 15/484,830 Notice of Allowance dated Jan. 25, 2018", 12 pages.

ISA, "PCT Application No. PCT/US17/27070 International Search Report and Written Opinion dated Jul. 10, 2017", 10 pages.

IPO, "UK Application No. 1610609.8 Search and Examination Report dated Nov. 2, 2016", 8 pages.

IPO, "UK Application No. 1611301.1 Combined Search and Examination Report dated Dec. 21, 2016", 6 pages.

WIPO, "PCT Application No. PCT/US17/27070 International Preliminary Report on Patentability dated Oct. 26, 2018", , 8 pages.

USPTO, "U.S. Appl. No. 15/924,449 Non-Final Office Action dated Apr. 17, 2019", 9 pages.

USPTO, "U.S. Appl. No. 15/946,026 Non-Final Office Action dated May 1, 2019", 12 pages.

"U.S. Appl. No. 15/924,449 Notice of Allowance dated May 22, 2019", 10 pages.

IPO, "UK Application No. 1610609.8 Examination Report dated Jun. 24, 2019", 6 pages.

"U.S. Appl. No. 15/946,026 Notice of Allowance dated Aug. 30, 2019", 9 pages.

UKIPO, "UK Application No. 1910544.4 Combined Search and Examination Report dated Aug. 20, 2019", 5 pages.

* cited by examiner

ENDPOINT MALWARE DETECTION USING AN EVENT GRAPH

CROSS-REFERENCE TO RELATED APPLICATIONS

This application is a continuation of U.S. patent application Ser. No. 15/484,830, filed on Apr. 11, 2017, which is a continuation-in-part of U.S. patent application Ser. No. 15/130,244, filed on Apr. 15, 2016, each of which is incorporated herein by reference in its entirety. This application also claims priority to United Kingdom Pat. App. No. 1610609.8, filed on Jun. 17, 2016, and United Kingdom Pat. App. No. 1611301.1, filed on Jun. 29, 2016, where each is incorporated herein by reference in its entirety.

TECHNICAL FIELD

This application relates to forensic analysis of computing activity, e.g., to techniques for identifying root causes of security compromises in a complex computing environment, and to malware detection using an event graph.

BACKGROUND

As malware becomes more sophisticated, it has become increasingly difficult to identify the impact of a security compromise, even after an event is detected, and it has become increasingly difficult to distinguish malicious computing activity from other computer processes and user activity. There remains a need for improved techniques for forensic analysis to assist an investigator investigating security events, and there generally remains a need for improved techniques for detecting malware on endpoints in an enterprise network.

SUMMARY

A data recorder stores endpoint activity on an ongoing basis as sequences of events that causally relate computer objects such as processes and files. When a security event is detected, an event graph may be generated based on these causal relationships among the computing objects. For a root cause analysis, the event graph may be traversed in a reverse order from the point of an identified security event (e.g., a malware detection event) to preceding computing objects, while applying one or more cause identification rules to identify a root cause of the security event. Once a root cause is identified, the event graph may be traversed forward from the root cause to identify other computing objects that are potentially compromised by the root cause.

An aspect includes a computer program product for forensic analysis for computer processes, where the computer program product includes computer executable code embodied in a non-transitory computer readable medium that, when executing on a computing device, performs the steps of instrumenting a first endpoint to monitor a number of causal relationships among a number of computing objects and to record a sequence of events causally relating the number of computing objects, detecting a security compromise event associated with one of the number of computing objects, and in response to detecting the security compromise event, traversing an event graph based on the sequence of events in a reverse order from the one of the computing objects associated with the security compromise event to one or more preceding ones of the computing objects. The computer program product may also include code that performs the steps of applying a cause identification rule to the preceding ones of the computing objects and the causal relationships while traversing the event graph to identify one of the computing objects as a cause of the security compromise event, and traversing the event graph forward from the cause of the security compromise event to identify one or more other ones of the computing objects compromised by the cause.

In another aspect, a method for forensic analysis for computer processes may include instrumenting a first endpoint to monitor a number of causal relationships among a number of computing objects and to record a sequence of events causally relating the number of computing objects, detecting a security event associated with one of the number of computing objects, and in response to detecting the security event, traversing an event graph based on the sequence of events in a reverse order from the one of the computing objects associated with the security event to one or more preceding ones of the computing objects. The method may also include applying a cause identification rule to the preceding ones of the computing objects and the causal relationships while traversing the event graph to identify one of the computing objects as a cause of the security event, and traversing the event graph forward from the cause of the security event to identify one or more other ones of the computing objects affected by the cause.

Implementations may include one or more of the following features. The number of causal relationships may include one or more of a data flow, a control flow, and a network flow. Detecting the security event may include detecting a security compromise by applying static analysis to software objects on the first endpoint. Detecting the security event may include detecting a security compromise by applying behavioral analysis to code executing on the first endpoint. Detecting the security event may include detecting a hardware change. Detecting the security event may include detecting a potential data leakage. The one or more computing objects may include one or more types of computing objects selected from a group consisting of a data file, a process, an application, a registry entry, a network address, and a peripheral device. The one or more computing objects may include one or more network addresses, the one or more network addresses including at least one of a uniform resource locator (URL), an internet protocol (IP) address, and a domain name. The one or more computing objects may include one or more peripheral devices, the one or more peripheral devices including at least one of a universal serial bus (USB) memory, a camera, a printer, and a keyboard. A number of events within the sequence of events may be preserved for a predetermined time window, where the predetermined time window has a different duration for at least two types of computing objects. The one or more computing objects may include at least one computing object on a device other than the first endpoint. The device may include at least one of a second endpoint and a server. The cause identification rule may associate the cause with one or more common malware entry points. The one or more common malware entry points may include at least one of a word processing application, an electronic mail application, a spreadsheet application, a browser, and a universal serial bus (USB) drive. The cause identification rule may associate the cause with a combination of a first process invoking a second process and then providing data to the second process. The first process invoking the second process may include at least one of a spawning, a hijacking, and a remote launch over a network. Providing data to the second process may include creating a file for use by the second process. The method may further include generating the event graph.

In an aspect, a system for forensic analysis for computer processes includes a first endpoint, a data recorder instrumented to monitor a number of causal relationships among a number of computing objects on the first endpoint and to record a sequence of events causally relating the number of computing objects, and a processor and a memory disposed on the first endpoint or in communication with the first endpoint. The memory may bear computer code that, when executing on the processor, performs the steps of detecting a security event associated with one of the number of computing objects on the first endpoint, and, in response to detecting the security event, traversing an event graph based on the sequence of events in a reverse order from the one of the computing objects associated with the security event to one or more preceding ones of the computing objects. The memory may further bear computer code that, when executing on the processor, performs the steps of applying a cause identification rule to the preceding ones of the computing objects and the causal relationships while traversing the event graph to identify one of the computing objects as a cause of the security event, and traversing the event graph forward from the cause of the security event to identify one or more other ones of the computing objects affected by the cause.

A data recorder stores endpoint activity on an ongoing basis as sequences of events that causally relate computer objects such as processes and files, and patterns within this event graph can be used to detect the presence of malware on the endpoint. The underlying recording process may be dynamically adjusted in order to vary the amount and location of recording as the security state of the endpoint changes over time.

In an aspect, a computer program product for detecting malware on an endpoint in an enterprise network may include computer executable code embodied in a non-transitory computer readable medium that, when executing on the endpoint, performs the steps of instrumenting the endpoint to monitor a number of causal relationships among a number of computing objects at a plurality of logical locations within a computing environment on the endpoint, selecting a set of logical locations from the plurality of logical locations, recording a sequence of events causally relating the number of computing objects at the set of logical locations, creating an event graph based on the sequence of events, evaluating a security state of the endpoint based on the event graph, adjusting the set of logical locations by adding a new logical location, removing an existing logical location, or changing a level of filtering at one of the set of logical locations according to the security state of the endpoint, and remediating the endpoint when the security state is compromised.

In another aspect, a method for malware detection includes instrumenting a first endpoint to monitor a number of causal relationships among a number of computing objects at a plurality of logical locations within a computing environment related to the first endpoint, selecting a first set of logical locations from the plurality of logical locations, recording a sequence of events causally relating the number of computing objects at the first set of logical locations, creating an event graph based on the sequence of events, applying a malware detection rule to the event graph, and remediating the first endpoint when the malware detection rule and the event graph indicate a compromised security state.

Implementations may include one or more of the following features. Selecting the first set of logical locations may include selecting a group from the plurality of logical locations based on exposure to an external environment. Selecting the first set of logical locations may include selecting a group from the plurality of logical locations based on reputation. The method may further include excluding at least one of the plurality of logical locations associated with a known, good process. The method may further include selecting a second set of logical locations different from the first set of logical locations in response to an observed event graph for the sequence of events. The method may further include adding one or more of the plurality of logical locations to the first set of logical locations in response to a detected increase in security risk. The method may further include removing one of the plurality of logical locations from the first set of logical locations in response to a detected decrease in security risk. The method may further include filtering one or more of the events in the sequence of events according to reputation. The plurality of logical locations may include at least one endpoint separate from the first endpoint. The plurality of logical locations may include at least one programming interface to a human interface device. The method may further include identifying one of the computing objects as a cause of the compromised security state and remediating the one of the computing objects. The method may further include traversing the event graph forward from the cause to identify one or more other ones of the computing objects affected by the cause. The number of causal relationships may include a data flow. The number of causal relationships may include a control flow. The number of causal relationships may include a network flow. The one or more computing objects may include one or more types of computing objects selected from a group consisting of a data file, a process, an application, a registry entry, a network address, and a peripheral device. A number of events within the sequence of events may be preserved for a predetermined time window, and where the predetermined time window has a different duration for at least two different types of computing objects.

In an aspect, an endpoint may include a network interface, a memory, and a processor configured by computer executable code stored in the memory to detect malware by performing the steps of instrumenting the endpoint to monitor a number of causal relationships among a number of computing objects at a plurality of logical locations within a computing environment related to the endpoint, selecting a first set of logical locations from the plurality of logical locations, recording a sequence of events causally relating the number of computing objects at the first set of logical locations, creating an event graph based on the sequence of events, applying a malware detection rule to the event graph, and remediating the endpoint when the malware detection rule and the event graph indicate a compromised security state. The processor may be further configured to adjust the set of logical locations by adding a new logical location, removing an existing logical location, or changing a level of filtering at one of the set of logical locations according to a security state of the endpoint.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
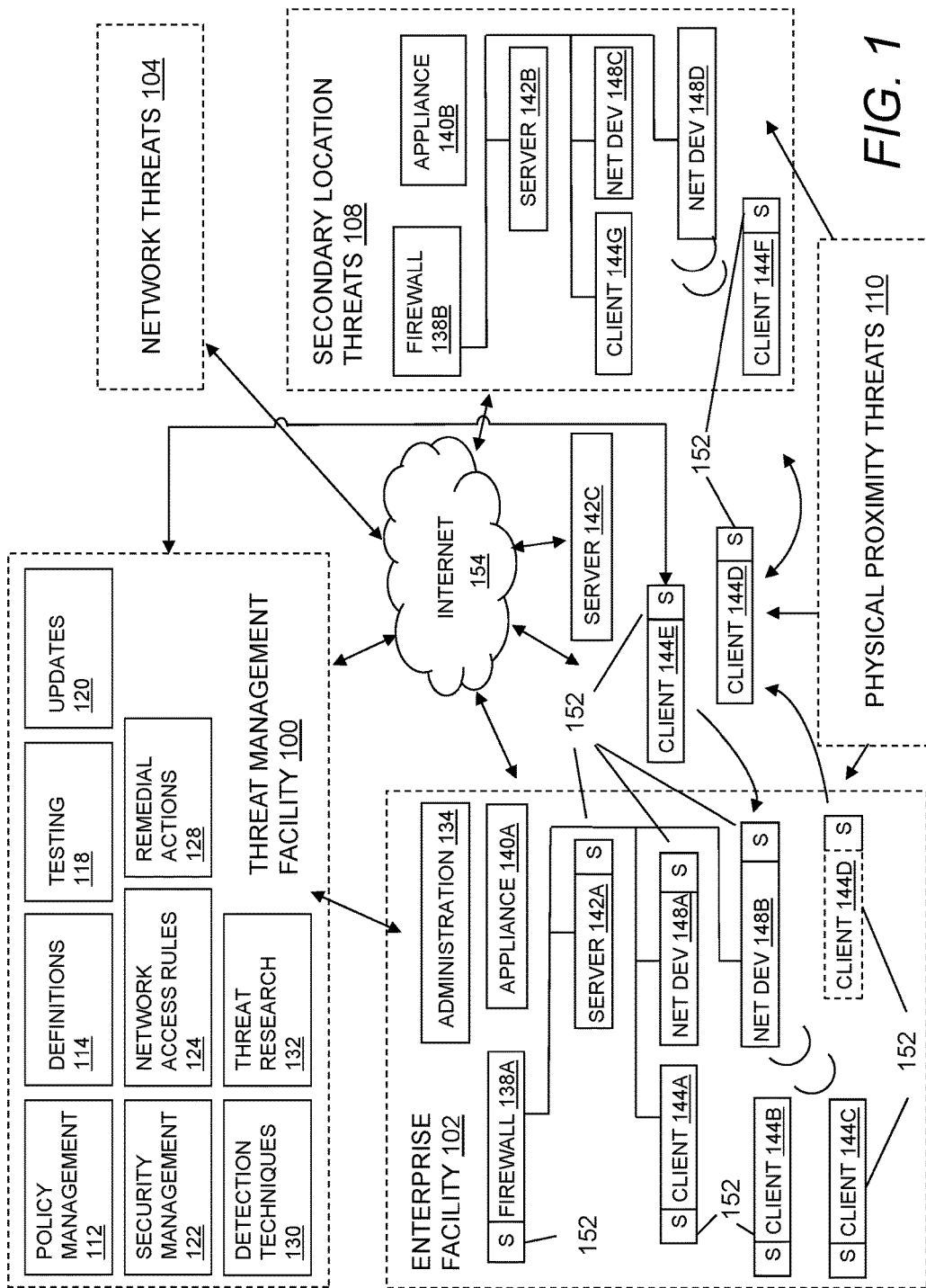
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 may take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, e.g., the firewall facility 138 or gateway; at the server facility 142; at distribution points within the network, e.g., the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance, the mobile client facility (e.g., the clients 144B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
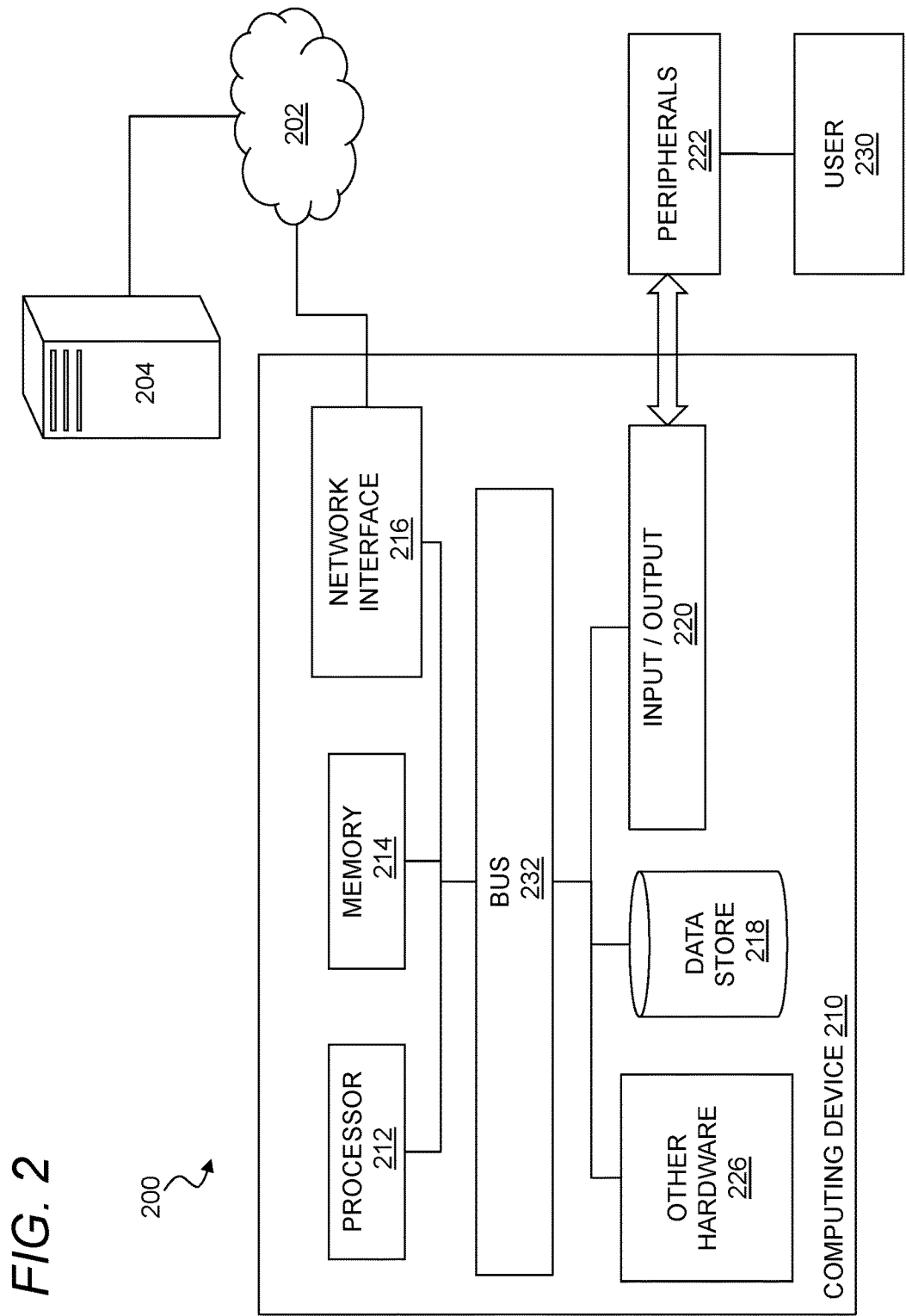
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any device suitable for interacting with other devices over a network 202, such as a laptop computer, a desktop computer, a personal digital assistant, a tablet, a mobile phone, a television, a set top box, a wearable computer, and the like. The computing device 210 may also or instead include a server such as any of the servers described herein.

The computing device 210 may be used for any of the entities described in the threat management environment described above with reference to FIG. 1. For example, the computing device 210 may be part of or may include a client an enterprise facility, a threat management facility, or any of the other facilities or computing devices described therein. In certain aspects, the computing device 210 may be implemented using hardware or a combination of software and hardware. The computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

In general, the computing device 210 may include a processor 212, a memory 214, a network interface 216, a data store 218, and one or more input/output interfaces 220. The computing device 210 may further include or be in communication with peripherals 222 and other external input/output devices that might connect to the input/output interfaces 220.

The processor 212 may be any processor or other processing circuitry capable of processing instructions for execution within the computing device 210 or computer system 200. The processor 212 may include a single-threaded processor, a multi-threaded processor, a multi-core processor and so forth. The processor 212 may be capable of processing instructions stored in the memory 214 or the data store 218.

The memory 214 may store information within the computing device 210. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 210 and configuring the computing device 210 to perform functions for a user. The memory 214 may include a number of different stages and types of memory for different aspects of operation of the computing device 210. For example, a processor may include on-board memory and/or cache for faster access to certain data or instructions, and a separate, main memory or the like may be included to expand memory capacity as desired. All such memory types may be a part of the memory 214 as contemplated herein.

The memory 214 may, in general, include a non-volatile computer readable medium containing computer code that, when executed by the computing device 210 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein may be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Described herein are techniques for forensic analysis of computer processes. These forensic analysis techniques may use any of the components or systems described with reference to the figures above. For example, the techniques for forensic analysis for computer processes may be implemented by the threat management facility 100 described with reference to FIG. 1, e.g., for one or more endpoints included on an enterprise facility 102. Also, the forensic analysis techniques may utilize any of the features of the threat management facility 100 described with reference to FIG. 1, e.g., the detection techniques 130. The techniques for forensic analysis for computer processes may also or instead be used for a computing device 210 as described with reference to FIG. 2 above.

Forensic analysis for computer processes may include a root cause analysis—e.g., determining and analyzing an origin or root cause of a piece of malware. Techniques may include monitoring activity for one or more endpoints and recording the activity in a data recorder or the like. The data recorder may include a database or data store. The data recorder may act as a rolling buffer, e.g., storing a large amount of data for predetermined time windows before overwriting old data with new data. The data recorder may collect information about device activity, such as file creations, process creations, registry changes, memory injections, and so forth. In an aspect, when a beacon or trigger event is detected (e.g., an event pertinent to computer or network security), information from the data recorder may be analyzed (e.g., starting at the trigger event) to determine a root cause and to determine affected computing objects. Existing compromise detection techniques such as host intrusion prevention, malicious traffic detection, uniform resource locator (URL) blocking, file-based detection, and so on, may be used to detect the beacon or trigger event. In this manner, techniques for forensic analysis for computer processes may be combined with other malware and compromise prevention, detection, analysis, and remediation techniques such as any as described herein. An event graph may be generated showing connected events that are causally related to the detected event, e.g., based on one or more rules. Based on an analysis of these causally related events, the root cause of a detected event can be determined, and affected events going forward from the root cause can similarly be identified.

Figure 3:
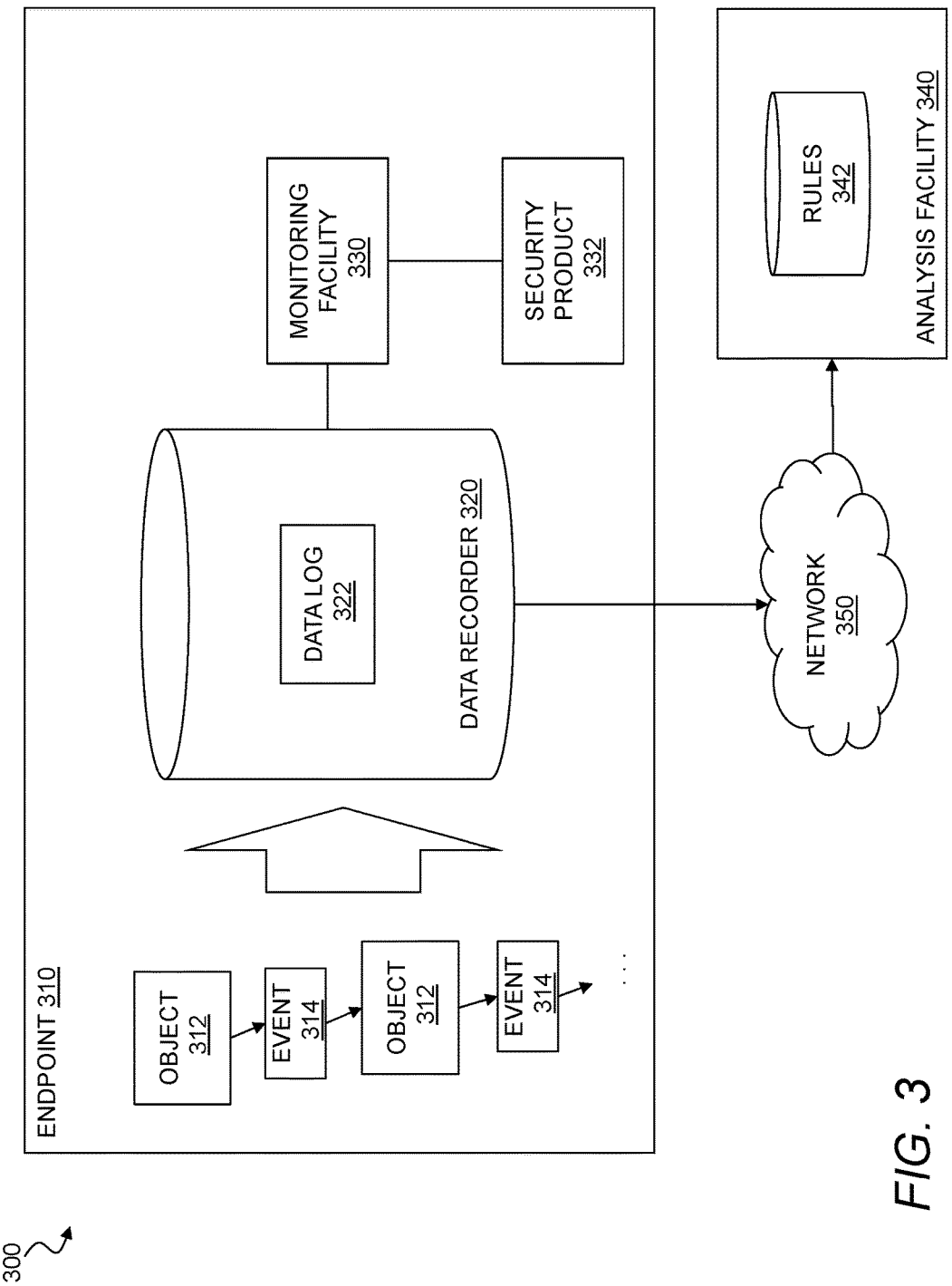
FIG. 3 illustrates a system for forensic analysis for computer processes.

FIG. 3 illustrates a system for forensic analysis for computer processes. The system 300 may include an endpoint 310 containing a data recorder 320, a monitoring facility 330, and any number of objects 312 and events 314. An analysis facility 340 may be coupled in a communicating relationship with the endpoint 310 over a data network 350 such as any of the networks described above. It will be appreciated that, while illustrated as components of the endpoint 310, certain components of the system 300 such as the data recorder 320 and the monitoring facility 330 and the analysis facility may also or instead be realized as remote services instantiated on a virtual appliance, a public or private cloud, or the like, any of which may be coupled to the endpoint 310 through the data network 350 or another communication channel (not shown). Each of the components of the system 300 may be configured with suitable programming and configuration to participate in the various forensic techniques, threat detection techniques, and security management techniques contemplated herein.

The endpoint 310 may be any of the endpoints described herein, e.g., a computing device in an enterprise network, or any other device or network asset that might join or participate in an enterprise or otherwise operate on an enterprise network. This may, for example, include a server, a client device such as a desktop computer or a mobile computing device (e.g., a laptop computer or a tablet), a cellular phone, a smart phone, or other computing device suitable for participating in the system 300 or in an enterprise.

In general, the endpoint 310 may include any number of computing objects 312, which may for example, be processes executed by one or more processors or other processing circuitry, files or data stored in memory, or any other computing objects described herein. While the term object has a number of specific meanings in the art, and in particular in object-oriented programming, it will be understood that the term 'object' as used herein is intended to be significantly broader, and may include any data, process, file or combination of these including without limitation any process, application, executable, script, dynamic linked library (DLL), file, data, database, data source, data structure, function, resource locator (e.g., uniform resource locator (URL) or other uniform resource identifier (URI)), or the like that might be resident on the endpoint 310 and manipulated by the endpoint 310 or another component of the system 300 or other systems described elsewhere herein. The object 312 may also or instead include a remote resource, such as a resource identified in a URL. That is, while the object 312 in the figure is depicted as residing on the endpoint 310, an object 312 may also reside elsewhere in the system 300, and may be specified for example with a link, pointer, or reference that is locally stored on the endpoint 310.

The object 312 may be an item that is performing an action or causing an event 314, or the object 312 may be an item that is receiving the action or is the result of an event 314 (e.g., the object 312 may be an item in the system 300 being acted upon by an event 314 or another object 312). In general, an event 314 as contemplated herein may be any data flow, execution flow, control flow, network flow, or other similar action or event that might causally relate objects 312 to one another. Where the object 312 is data or includes data, the object 312 may be encrypted or otherwise protected, or the object 312 may be unencrypted or otherwise unprotected. The object 312 may be a process or other computing object that performs an action, which may include a single event 314 or a collection or sequence of events 314 taken by a process. The object 312 may also or instead include an item such as a file or lines of code that are executable to perform such actions. The object 312 may also or instead include a computing component upon which an action is taken, e.g., a system setting (e.g., a registry key or the like), a data file, a URL, and so forth. The object 312 may exhibit a behavior such as an interaction with another object or a component of the system 300.

Objects 312 may be described in terms of persistence. The object 312 may, for example, be a part of a process, and remain persistent as long as that process is alive. The object 312 may instead be persistent across an endpoint 310 and remain persistent as long as an endpoint 310 is active or alive. The object 312 may instead be a global object having persistence outside of an endpoint 310, such as a URL or a data store. In other words, the object 312 may be a persistent object with persistence outside of the endpoint 310.

Although many if not most objects 312 will typically be benign objects forming a normal part of the computing environment for an operating endpoint 310, an object 312 may contain software associated with an advanced persistent threat (APT) or other malware that resides partially or entirely on the endpoint 310. This associated software may have reached the endpoint 310 in a variety of ways, and may have been placed manually or automatically on the endpoint 310 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 310. Further, the associated software may install from a file on the endpoint 310 (or a file remote from the endpoint 310), and the associated software may create one or more files such as data files or the like while executing. Associated software should be understood to generally include all such files and processes except where a specific file or process is more specifically noted.

An event 314 may include an action, a behavior, an interaction, and so forth. The event 314 may be generated by or otherwise related to an object 312. For example, the event 314 may be associated with a file and include an action such as a read, a write, an open, a move, a copy, a delete, and so forth. The event 314 may also or instead include an interprocess communication, e.g., a create, a handle, a debug, a remote injection, and so forth. The event 314 may also or instead include a network action such as accessing an Internet Protocol (IP) address or URL.

The data recorder 320 may monitor and record activity related to the objects 312 and events 314 occurring on the endpoint 310. The activity of the endpoint 310 may be stored in a data log 322 or the like on the data recorder 320, which may be stored locally on the endpoint 310 (as depicted) or remotely at a threat management resource, or some combination of these, such as where the data log 322 is periodically transmitted to a remote facility for archiving or analysis. The data recorder 320 may continuously record any activity occurring on the endpoint 310 for predetermined periods of time before overwriting previously recorded data. Thus, the data log 322 may include a continuous data feed of events 314. When an event 314 is detected that is a beacon or trigger event (such as a file detection, a malicious traffic detection, or the like), the data log 322 may be saved and transmitted to an analysis facility 340 or the like for analysis, e.g., to determine a root cause of the beacon or trigger event. The data log 322 may be used to create an event graph or other snapshot of the activity on the endpoint 310, e.g., for a period of time surrounding a beacon or trigger event. The beacon or trigger event may be detected locally by the monitoring facility 330, or remotely by a remote threat management facility or the like, or some combination of these.

While illustrated on the endpoint 310, it will be understood that the data recorder 320 may also or instead be implemented at a remote location such as a threat management facility or other enterprise network security resource, or some combination of these. The data recorder 320 may be provisioned on the same or a different device than a data store in which data is stored. The data recorder 320 may be configured to record data as efficiently as possible so as to minimize impact on the endpoint 310.

The monitoring facility 330 may work in conjunction with the data recorder 320 to instrument the endpoint 310 so that any observable events 314 by or involving various objects 312 can be monitored and recorded. It will be appreciated that various filtering rules and techniques may be used to synopsize, summarize, filter, compress or otherwise process information captured by the data recorder 320 to help ensure that relevant information is captured while maintaining practical limits on the amount of information that is gathered.

A security product 332 may execute on the endpoint 310 to detect a security event on the endpoint 310, which may act as the beacon or trigger event for the system 300. The security product 332 may use techniques such as signature-based and behavioral-based malware detection including without limitation one or more of host intrusion prevention, malicious traffic detection, URL blocking, file-based detection, and so forth.

The beacon or trigger event on the endpoint 310 may be a fully qualified (e.g., definitive) detection of a compromise or other malicious activity. In another aspect, the beacon or trigger event on the endpoint 310 may be a suspicious behavior that is suspicious but not confirmed as malicious. For example, the beacon or trigger event on the endpoint 310 may signal an unusual behavior that is known to commonly appear concurrently with the detection of malware. In an aspect, when the beacon or trigger event is a suspicious behavior, the data log 322 may be analyzed differently than when the beacon or trigger event is a confirmed malicious behavior. For example, the data log 322 may be sent to a different component of the system 300 through the network, e.g., to a different analysis facility 340.

The monitoring facility 330 may be disposed remotely from the endpoint 310 or analysis facility 340. The monitoring facility 330 may be included on one or more of the endpoint 310 or analysis facility 340. In an aspect, the monitoring facility 330 and the analysis facility 340 included in the same component.

The analysis facility 340 may analyze the data log 322, e.g., as part of a root cause analysis and to identify objects 312 compromised by the root cause. To this end, the analysis facility 340 may utilize one or more rules 342 for applying to the data included in the data log 322 to determine a root cause of a beacon or trigger event such as a suspected or actual security compromise on the endpoint 310. The analysis facility 340 may reside locally on the endpoint 310 (e.g., be a part of, embedded within, or locally coupled to the endpoint 310). The analysis facility 340 may be an external facility, or it may reside in a virtual appliance (e.g., which could be run by a protected set of systems on their own network systems), a private cloud, a public cloud, and so forth. The analysis facility 340 may store locally-derived threat information for use in subsequent identification, remediation, or other similar activity. The analysis facility 340 may also or instead receive threat information from a third-party source such as any public, private, educational, or other organization that gathers information on network threats and provides analysis and threat detection information for use by others. This third-party information may, for example, be used to improve detection rules or other forensic analysis that might be performed on information in the data log 322.

The analysis facility 340 may create an event graph. In general, the event graph may represent information in the data log 322 in a graph where objects 312 are nodes and events 314 are edges connecting the nodes to one another based on causal or other relationships as generally contemplated herein. The event graph may be used by the analysis facility 340 or other component(s) of the system 300 as part of a root cause analysis and to identify objects 312 compromised by the root cause. The event graph may also or instead be displayed to a user of the system 300 or endpoint 310, e.g., using an interactive user interface or the like.

The system 300 may advantageously use the data log 322 to configure and initialize an analysis in a sandboxed or otherwise isolated environment where the execution of the recorded activity related to a detected security event is allowed to run. That is, rather than uploading a complete image of an endpoint 310 using conventional techniques, the data log 322 may include only a series of events/processes related to the detected event that may be uploaded for execution/analysis. The analysis may thus include executing this series of events/processes in the same order to determine a threat level for the endpoint 310.

The data log 322 may include data from a single endpoint 310, or from a number of endpoints 310, for example where one endpoint 310 accesses a service or a file on another endpoint. This advantageously facilitates tracking or detection of potentially malicious activity that spans multiple devices, particularly where the behavior on a single endpoint does not appear malicious. Thus, the monitoring facility 330 may monitor activity from an endpoint 310 exclusively, or use the full context of activity from all protected endpoints 310, or some combination of these. Similarly, the event graph generated from the data log 322 may include activity from one endpoint 310 exclusively, or use the full context of activity from all protected endpoints 310, or some combination of these. Data logs 322 and event graphs may also or instead be stored for future analyses, e.g., for comparing to future data logs and event graphs.

Similarly, the events may include human interactions such as keyboard strokes, mouse clicks or other input and output to human interface devices and hardware. This usefully permits discrimination within causal chains among events initiated by processes executing on a device and events that are initiated or controlled by a human user that is present on the endpoint.

Figure 4:
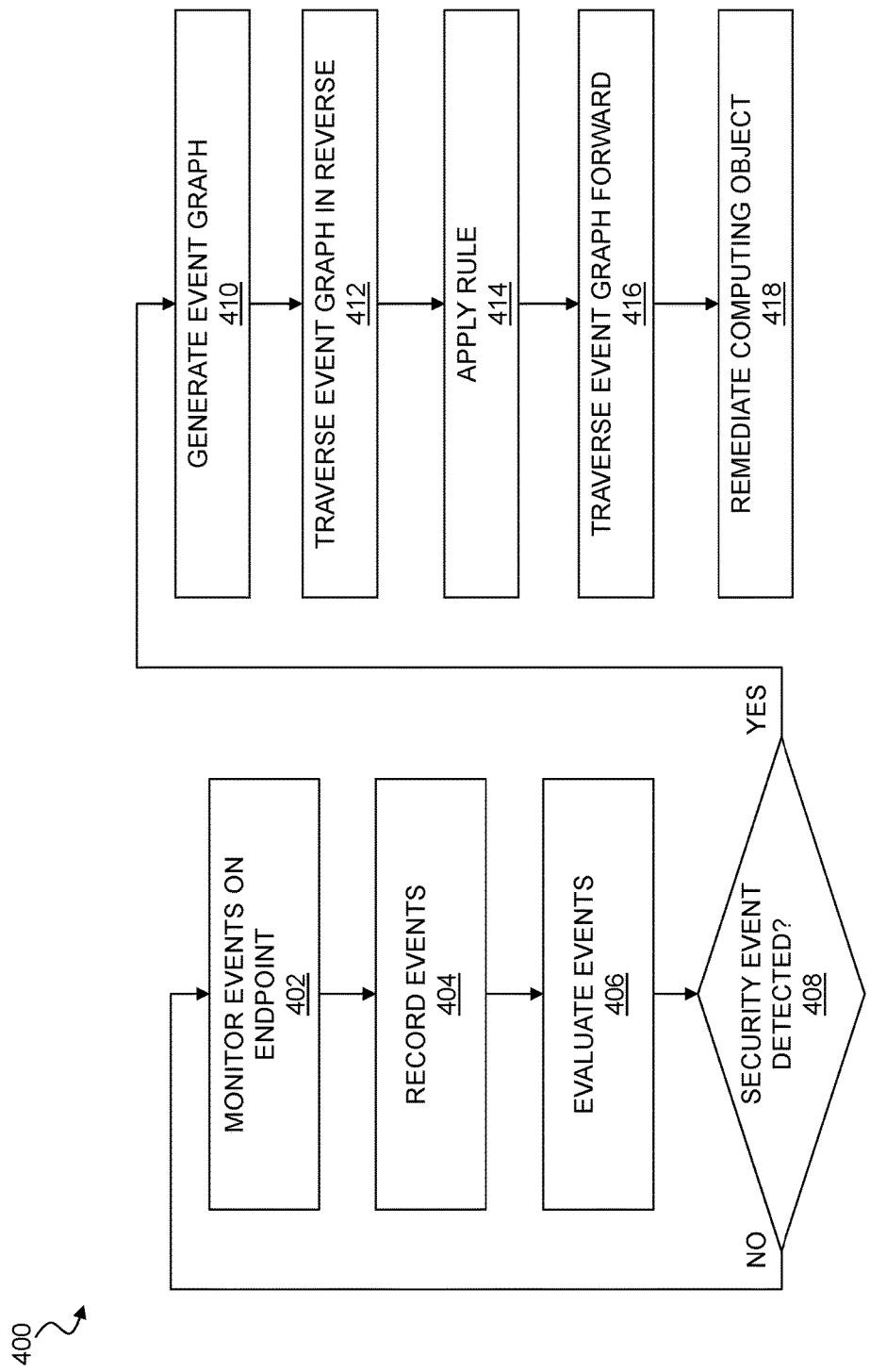
FIG. 4 is a flowchart of a method for forensic analysis for computer processes.

FIG. 4 is a flowchart of a method for forensic analysis for computer processes. The method 400 may be implemented by any of the systems described above or otherwise herein. The method 400 may be used as part of a root cause analysis, e.g., for determining a root cause of malware on an endpoint, and for identifying computing objects affected by malware, e.g., computing objects causally related to the root cause.

As shown in step 402, the method 400 may include monitoring events on a device, such as a first endpoint. The events may be any as described herein, e.g., events associated with computing objects on the endpoint. The computing objects may, for example include a data file, a process, an application, a registry entry, a network address, a peripheral device, or any of the other computing objects described herein. For example, in an aspect, the computing objects may include one or more network addresses specified at any suitable level of abstraction or according to any suitable protocol such as a uniform resource locator (URL), an Internet Protocol (IP) address, and a domain name, and may include any or a portion of associated path information or the like that might be associated therewith. The computing objects may also or instead include a peripheral device such as a universal serial bus (USB) memory, a camera, a printer, a memory card, a removable bulk storage device, a keyboard, a mouse, a track pad, a printer, a scanner, a cellular phone, or any other input or output device that might usefully be connected to an endpoint, a server, a mobile device, and so forth. Events may include information or messages from a threat management facility, firewall, network device, and so on, for example, that may be resident on or in communication with an endpoint. For example, a threat management facility may identify a potential or actual threat, and this may be treated as an event.

In an aspect, monitoring events on a first endpoint may include instrumenting a first endpoint to monitor a number of causal relationships among a number of computing objects. For example, a monitoring facility or other monitoring component (e.g., a component disposed on the first endpoint or otherwise in communication with the first endpoint), may be configured to detect computing objects and to monitor events on the first endpoint that associate the computing objects in a number of causal relationships. Thus, a processor and a memory disposed on the endpoint may be configured to monitor events on the endpoint. A remote server may also or instead be configured to monitor events on the endpoint, for example, to create a data log as contemplated herein.

Implementations may also or instead include monitoring events on multiple endpoints, e.g., endpoints included in an enterprise network or the like. Thus, in an aspect, the one or more computing objects include at least one or more computing object(s) on a device other than the first endpoint, such as a second endpoint in the enterprise network. The device may also or instead include a server configured to provide remote resources to other endpoints, network devices, firewalls, gateways, routers, wireless access points, mobile devices, and so forth.

The causal relationships monitored by the system may include dependencies that form a link or an association between computing objects or events. Useful causal relationships may include a data flow, e.g., linking computing objects based on the flow of data from one computing object to another computing object. The causal relationships may also or instead include a control flow. For example, a first computer program may generate a first event that triggers a second computer program to trigger a second event, thereby creating a causal relationship between the first computer program and the second computer program (and possibly a causal relationship between the first event and the second event). In yet another aspect, the causal relationships may include a network flow. For example, a computing object may access a URL or other remote resource or location and receive data. In this example, there may be a causal relationship between one or more of the computing object, the URL, and the data. It will be understood that the term "causal relationship" and the like is intended to cover a wide range of relationships between computing objects that might be formed by events, and unless explicitly stated to the contrary or otherwise clear from the text, the causal relationships may include anything that can link or associate multiple computing objects (of the same type or different types), e.g., in a directional manner, directly or indirectly.

As shown in step 404, the method 400 may include recording events such as any of the events described above that occur on the endpoint. Thus, each event detected during monitoring may be recorded, e.g., by a data recorder or other component, to provide a data log including a sequence of events causally relating the number of computing objects. As described above, the data recorder may be configured to record events that occur on the endpoint, or events that occur on a plurality of endpoints. The data recorder may be locally disposed on the endpoint or otherwise in communication with the endpoint. The data recorder may also or instead be associated with a monitoring facility or an analysis facility such as any of those described above. The data recorder may record a sequence of events causally relating a number of computing objects on one or more endpoints in a data log or the like disposed in a memory.

A number of events within the sequence of events may be preserved for a predetermined time window. For example, in an aspect, a data recorder or the like may record all activity on an endpoint in a rolling buffer that overwrites data that is older than the predetermined time window. This may be true regardless of the types of computing objects associated with the sequence of events. In another aspect, the predetermined time window may have a different duration for different types of computing objects (e.g., for at least two types of computing objects). By way of example, when the computing objects include one or more network addresses, the sequence of events may be preserved for a longer predetermined time window relative to a sequence of events associated with data files, or vice-versa. Similarly, when the computing objects include one or more peripheral devices such as USB memories, the sequence of events may be preserved for longer predetermined time window relative to a sequence of events associated with applications, or vice-versa. In implementations, the predetermined time window for which the sequence of events is preserved may be based on the likelihood of a security event originating from a certain type of computing object. For example, the reputation of a computing object (e.g., an application) or a machine state may be used for determining the duration of the predetermined time window for which the sequence of events is preserved. Further, the predetermined time window for which the sequence of events is preserved may be determined by a color of a computing object or event, e.g., as described in U.S. patent application Ser. No. 14/485,759 filed on Sep. 14, 2014, which is incorporated by reference herein in its entirety. In an aspect, the time window for which the sequence of events is preserved may be variable or adjustable. For example, a user or administrator using a user interface or the like may adjust the time window for which the sequence of events is preserved, e.g., based on computing object type or otherwise. For example, one or more first event types may be recorded with a first time window and one or more second event types may be recorded with a second time window.

In an aspect, the data recorder or the like may record only certain activity on an endpoint, e.g., activity associated with predetermined computing objects. The activity may be preserved for a predetermined amount of time dependent upon the specific computing object to which the activity is associated. In this manner, and by way of example, the data recorder or the like may include a record of data for one week for applications, for three months for files, for two weeks for registry entries, and so forth. It will be understood that these timeframes are provided by way of example and not of limitation.

In general, data may be continuously recorded, periodically recorded, or some combination of these. Furthermore, data may be cached, stored, deleted or transmitted to a remote processing facility in any suitable manner consistent with appropriate use of local and remote resources, and the utility or potential utility of information that is being recorded. In one aspect, data may be periodically deleted or otherwise removed from the data recorder, such as after a security event has been detected and addressed as described below. A new data log may then be created for recording subsequent events on the one or more endpoints.

As shown in step 406, the method 400 may include evaluating one or more events that occur on the endpoint. The evaluation of the one or more events may include the application of one or more security rules to determine whether the one or more events indicate or suggest a security event such as a security compromise event, a data exposure, a malware detection, or the like. Thus, the evaluation of the one or more events may lead to the detection of a security event. While illustrated as a separate step, this step 406 may be performed concurrently with or in sequence with the monitoring step 402 discussed above.

The security event may be any beacon or trigger event, such as any of those discussed herein. The security event may include an event that is related to network security, computer security, data security, data leakage, data exposure, or any other actual or potential security issue. The security event may also or instead include other events of interest that are not directly related to computer/network security where, for example, they are useful for otherwise auditing or monitoring machines or characterizing device behavior. Thus, the security event may be any event general related to operation of a computer, and does not necessarily include an actual security compromise event. However, in implementations, the security event may include an actual compromise to a network, an endpoint, or a computer system such as the detection of malware or any other threat detection. For example, the security event may be a security compromise event related to a specific threat, e.g., an event related to computer-based malware including without limitation a virus, spyware, adware, a Trojan, an intrusion, an advanced persistent threat, spam, a policy abuse, an uncontrolled access, and so forth.

Detecting the security event may include detecting a security compromise by applying a static analysis to software objects on the first endpoint. For example, each software object may be individually analyzed for its compliance with a security policy or the like using signatures or other objective characteristics. It will be understood that while static analysis provides one useful form of evaluation for compliance with the security policy or the like, other techniques may also or instead be employed, e.g., a behavioral analysis, a sandbox execution, network traffic analysis, and so forth.

Detecting the security event may also or instead include detecting a security compromise by applying dynamic or behavioral analysis to code executing on the first endpoint, or to specific computing objects (e.g., processes) on the endpoint. For example, events that can warrant triggering the detection of the security event may include a process that loads a particular file that is known to be malicious, or a process that accesses a known malicious IP address, and the like.

In an aspect, detecting the security event may include detecting a hardware change or other state changes. Detecting the security event may also or instead include detecting a potential data leakage.

As discussed herein, a security policy may be used to detect a security event. This may include, for example, whitelists or blacklists of known computing objects and events, or reputations and signatures thereof. For example, a security policy may include rules that allow computing objects and events that are provided by a known, trusted source (e.g., a trusted user, endpoint, network, company, vendor, and so forth). The rules may be more complex, for example, where originating from a trusted source is only one factor in determining whether to whitelist computing objects and events. In general, the security policy may include any suitable rules, logic, prioritizing, etc., as desired to detect a security event.

Although referred to herein in terms of 'security,' one skilled in the art will recognize that a security policy may also or instead include other types of policies. For example, a security policy may include a corporate or network policy having a list of approved computing objects and events, where computing objects and events outside of this list may not necessarily be security risks, but are otherwise unwanted in the network. Thus, the security policy may intend to detect malware and the like, while also detecting other types of unwanted computing objects and events that do not qualify as malware.

More generally, any technique or combination of techniques suitable for evaluating endpoint activity for the detection of actual or potential security compromises may be used to detect security events as contemplated herein.

As shown in step 408, if a security event is not detected, the method 400 may return to step 402 where monitoring can continue. As further shown in step 408, if a security event is detected, a root cause analysis or the like may be performed to identify a source of the security event as further described below. That is, detecting a security event associated with one of the number of computing objects may trigger further analysis of other causally related computing objects on an endpoint (or in certain cases, remote from an endpoint) to identify a cause of the security event, as distinguished from the symptom that generated the beacon or trigger for the analysis.

As shown in step 410, the method 400 may include generating an event graph. The event graph may be generated in response to detecting the security event, e.g., using the data log from the data recorder. The event graph may be generated at the same time as or as part of creating the data log. The event graph may include the sequence of events causally relating the number of computing objects, and more specifically, the sequence of events and computer objects causally associated with the object(s) that triggered the detected security event.

As discussed herein, the event graph may be generated based on a data log of events and computer objects stored by a data recorder during operation of the endpoint. In particular, the data recorder may provide a dump of logged activities, which may be causally associated into a graph for analysis, navigation, display and so forth. Any useful portion of the data log may be used. For example, the data recorder may provide event data for a window of time before, after or surrounding the detected security event. The data log may be filtered, e.g., when the data is written to the data log (for example, by aging events as described above) or when the event graph is generated, or some combination of these. A variety of filtering techniques may be usefully employed. For example, certain types of objects or events may be removed from an event graph for specific trigger events, or certain groups of events may be condensed into a single event, such as all normal activity that occurs when a user logs into an endpoint. Similarly, computing objects that are too remote, either within the event graph or timewise, may be pruned and removed, particularly if they have a known, low diagnostic significance. Thus, the event graph may be filtered and condensed in a variety of manners to obtain a useful snapshot of events optimized for root cause analytics. Filtering of the data may be dependent upon the type of security event that is detected. Filtering of the data may adjust the level of detail included in the event graph based on memory limits, user parameters, security event type, or any other object metrics or inputs. In an aspect, the data is filtered based on reputation or the like, e.g., of computing objects included therein. For example, if an application has a good reputation, the application may not include a high level of detail associated therewith in a filtered version of the data log.

In one aspect, the event graph may be generated based on a data log from a number of different endpoints and thus may represent a causal chain of data from various different endpoints. This approach advantageously permits an analysis using data that spans multiple endpoints or other network devices within a single data structure or package, thus permitting identification of a root cause even when an attack employs a complex, multi-hop approach to network assets that might otherwise evade detection. Event graphs may also or instead be generated separately for different endpoints and presented to a user or analytical system as separate, discrete entities. Event graphs for endpoints may be compared with one another, e.g., as part of the root cause analysis. For example, by analyzing and comparing similar event graphs or event graphs sharing similar computing objects or events, a heuristic approach may be developed for identifying suspicious events and computing objects for one or more endpoints. Similarly, event graphs for different endpoints in the same network enterprise may be compared or combined, e.g., where two or more endpoints have been exposed to a security event or threat. For example, event graphs for similar time periods of two or more endpoints may be ascertained and analyzed.

In an aspect, cross-correlating between different data logs or event graphs may be utilized in a root cause analysis. For example, if the same security event or root cause is identified on different endpoints, the endpoints may be flagged for review or remediation. This type of analysis may be used on different endpoints throughout a network.

Implementations may include a number of different event graphs stored in a data store that can be used together to detect, prevent, or determine the root causes for suspicious activity or other activity of interest, e.g., a security event. As discussed herein, the event graphs may be filtered before being stored in the data store, which can remove system activity that is not of interest in such analyses. The event graphs may be searchable, e.g., for analysis of event graphs including similar computing objects or events. The event graphs may also or instead be linked to one another, e.g., event graphs including similar computing objects or events. The event graphs may be presented to a user on a user interface or the like, e.g., an interactive user interface that allows a user to see similar or related event graphs, search the event graphs, link between event graphs, and so forth.

An event graph may use a conventional structure of nodes (computing objects) and events (edges) to represent causal relationships among computing objects. This permits the use of a wide range of graph-based techniques to assist in analysis of the context leading up to a detected event. At the same time, numerous other data structures, computer representations, and visual representations of such interrelated objects and events are also known in the art, any of which may be employed as an event graph as contemplated herein, provided that enough descriptive data about the context of an endpoint is captured to facilitate the various types of analysis and response contemplated herein.

As shown in step 412, the method 400 may include, in response to detecting the security event, traversing the event graph based on the sequence of events in a reverse order from the one of the computing objects associated with the security event to one or more preceding ones of the computing objects. In general, the reverse order is a causally reverse order. For example, where a network flow, data flow or control flow has a direction from one computing object to another computing object, the reverse order will follow this flow or causal link from the receiving computing object backward toward the source computing object. However, this may also or instead include a chronological flow, such as in a complex event graph where the time of receipt for two different inputs from two different sources is relevant. In general, a review of each of the preceding computing objects may be conducted by working backward from the computing object associated with the security event, e.g., to determine a root cause of the security event. In an aspect, this may include a static analysis of each of the preceding computing objects, or a dynamic analysis of object and event interactions, or some combination of these.

As shown in step 414, the method 400 may include applying one or more rules to the computing objects preceding the security event. For example, the method 400 may include applying a cause identification rule to the preceding ones of the computing objects and the causal relationships while traversing the event graph in order to identify one of the computing objects as a cause of the security event. In general, the root cause analysis may attempt to identify a pattern in the event graph using cause identification rules to identify one of the computing objects (or a group of the computing objects and events) as a root cause of the security event.

The cause identification rule may associate the cause with one or more common malware entry points. For example, common entry points include a word processing application, an electronic mail application, a spreadsheet application, a browser, or a universal serial bus (USB) drive that is attached to an endpoint, and any of these computing objects, when encountered in an event graph, may be identified as a root cause. For example, when traversing the event graph in a reverse order from the security event, if the analysis identifies an electronic mail application that opened an attachment, this may be identified as the root cause because this is often a source of compromised security on an endpoint. Similarly, when traversing the event graph in a reverse order from the security event, if the analysis identifies a USB drive, or an unsecure or unencrypted USB drive, from which a file was opened, this may be identified as a likely cause of the security event. In one aspect, multiple candidate root causes may be identified using the cause identification rules, and a final selection may be based on other contextual information such as reputation, source, etc.

Security events may also or instead be caused by a certain combination of events or combinations of events and computing objects. For example, in an aspect, the cause identification rule may associate the cause of the security event with a combination that includes a first process invoking a second process and providing data to the second process. As used herein, invoking may be interpreted broadly, e.g., where any two processes share data through an intermediate file, or narrowly, e.g., where a first process specifically spawns the second process as a child process. More generally, invoking a process as used herein is intended to broadly include any causal relationship between to processes including, e.g., spawning a process, hijacking a process (e.g., seizing control of an existing process through thread injection, process hollowing, and the like), remotely launching a process over a network, instrumenting a service in the operating system, and the like. A cause identification rule may specify a particular type of invocation relationship between two processes, or multiple types of invocation, or any relationship between two processes. Providing data from a first process to a second process may include creating a file for use by the second process. For example, the cause of a security event may include a first process that writes a file and then takes control of a second process that reads data from the file so that the first process and the second process share data through the file.

Another example of a security event may include a known non-malicious application (e.g., a commonplace word processing application) launching a command line script, which may be identified as a cause of a security event. The activity underlying events that are generated may not necessarily be malicious, but they could lead to security events or other events of interest to be further analyzed. Thus, in one aspect, a cause identification rule may flag this behavior as a root cause of a security event, or as an event that is otherwise of diagnostic interest.

As shown in step 416, the method 400 may include traversing the event graph forward from an identified or presumed cause of the security event to identify one or more other ones of the computing objects affected by the cause. In this manner, an analysis of each of the computing objects in the event graph may be conducted by working forward from the root cause to other causally dependent computing objects that might be compromised or otherwise affected by the root cause. This may include labeling or otherwise identifying the potentially compromised objects, e.g. for remediation or further analysis. A pruning step may also be employed, e.g. where any computing objects that are not causally dependent on the root cause in some way are removed from the event graph.

As shown in step 418, the method 400 may include remediating one or more computing objects affected by the cause of the security event. Remediation may include deleting computing objects from the endpoint, or otherwise remediating the endpoint(s) using computer security techniques such as any described herein. In another aspect, the identification of the root cause may be used to create new detection rules capable of detecting a security event at a point in time (or causation) closer to the root cause within the event graph. Other remediation steps may include forwarding the event graph, or a filtered and pruned event graph, to a remote facility for analysis. This data may usefully provide a map for identifying sources of malware, or for ensuring thorough remediation by identifying all of the potentially compromised computing objects that should be examined after the compromise has been addressed.

Figure 5:
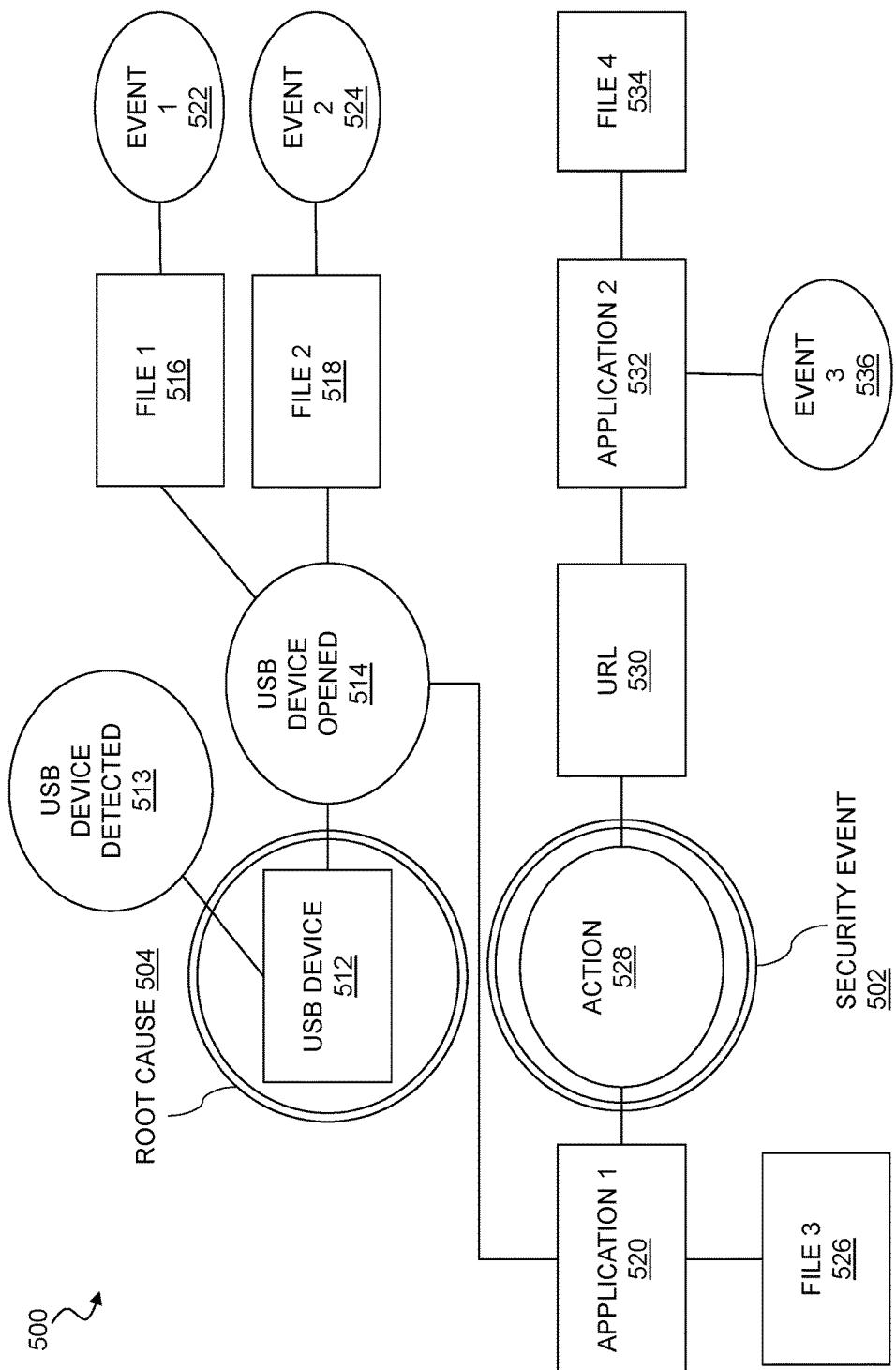
FIG. 5 illustrates an event graph.

FIG. 5 illustrates a graphical depiction of a portion of an example event graph 500. The event graph 500 may include a sequence of computing objects causally related by a number of events, and which provide a description of computing activity on one or more endpoints. The event graph 500 may be generated, for example, when a security event 502 is detected on an endpoint, and may be based on a data log or similar records obtained by an event data recorder during operation of the endpoint. The event graph 500 may be used to determine a root cause 504 of the security event 502 as generally described above. The event graph 500 may also or instead be continuously generated to serve as, or be a part of, the data log obtained by the data recorder. In any case, an event graph 500, or a portion of an event graph 500 in a window before or around the time of a security event, may be obtained and analyzed after a security event 502 occurs to assist in determining its root cause 504. The event graph 500 depicted in the figure is provided by way of example only, and it will be understood that many other forms and contents for event graphs 500 are also or instead possible. It also will be understood that while the figure illustrates a graphical depiction of an event graph 500, the event graph 500 may be stored in any suitable data structure or combination of data structures suitable for capturing the chain of events and objects in a manner that preserves causal relationships for use in forensics and malware detection as contemplated herein.

By way of example, the event graph 500 depicted in the figure begins with a computing object that is a USB device 512, which may be connected to an endpoint. Where the USB device 512 includes a directory or file system, the USB device 512 may be mounted or accessed by a file system on an endpoint to read contents. The USB device 512 may be detected 513 and contents of the USB device 512 may be opened 514, e.g., by a user of the endpoint or automatically by the endpoint in response to detection of the USB device 512. The USB device 512 may include one or more files and applications, e.g., a first file 516, a second file 518, and a first application 520. The first file 516 may be associated with a first event 522 and the second file may be associated with a second event 524. The first application 520 may access one or more files on the endpoint, e.g., the third file 526 shown in the figure. The first application 520 may also or instead perform one or more actions 528, such as accessing a URL 530. Accessing the URL 530 may download or run a second application 532 on the endpoint, which in turn accesses one or more files (e.g., the fourth file 534 shown in the figure) or is associated with other events (e.g., the third event 536 shown in the figure).

In the example provided by the event graph 500 depicted in the figure, the detected security event 502 may include the action 528 associated with the first application 520, e.g., accessing the URL 530. By way of example, the URL 530 may be a known malicious URL or a URL or network address otherwise associated with malware. The URL 530 may also or instead include a blacklisted network address that although not associated with malware may be prohibited by a security policy of the endpoint or enterprise network in which the endpoint is a participant. The URL 530 may have a determined reputation or an unknown reputation. Thus, accessing the URL 530 can be detected through known computing security techniques.

In response to detecting the security event 502, the event graph 500 may be traversed in a reverse order from a computing object associated with the security event 502 based on the sequence of events included in the event graph 500. For example, traversing backward from the action 528 leads to at least the first application 520 and the USB device 512. As part of a root cause analysis, one or more cause identification rules may be applied to one or more of the preceding computing objects having a causal relationship with the detected security event 502, or to each computing object having a causal relationship to another computing object in the sequence of events preceding the detected security event 502. For example, other computing objects and events may be tangentially associated with causally related computing objects when traversing the event graph 500 in a reverse order—such as the first file 516, the second file 518, the third file 525, the first event 522, and the second event 524 depicted in the figure. In an aspect, the one or more cause identification rules are applied to computing objects preceding the detected security event 502 until a cause of the security event 502 is identified.

In the example shown in the figure, the USB device 512 may be identified as the root cause 504 of the security event 502. In other words, the USB device 512 was the source of the application (the first application 520) that initiated the security event 502 (the action 528 of accessing the potentially malicious or otherwise unwanted URL 530).

The event graph 500 may similarly be traversed going forward from one or more of the root cause 504 or the security event 502 to identify one or more other computing objects affected by the root cause 504 or the security event 502. For example, the first file 516 and the second 518 potentially may be corrupted because the USB device 512 included malicious content. Similarly, any related actions performed after the security event 502 such as any performed by the second application 532 may be corrupted. Further testing or remediation techniques may be applied to any of the computing objects affected by the root cause 504 or the security event 502.

The event graph 500 may include one or more computing objects or events that are not located on a path between the security event 502 and the root cause 504. These computing objects or events may be filtered or 'pruned' from the event graph 500 when performing a root cause analysis or an analysis to identify other computing objects affected by the root cause 504 or the security event 502. For example, computing objects or events that may be pruned from the event graph 500 may include the USB drive 510 and the USB device being detected 513.

It will be appreciated that the event graph 500 depicted in FIG. 5 is an abstracted, simplified version of actual nodes and events on an endpoint for demonstration. Numerous other nodes and edges will be present in a working computing environment. For example, when a USB device is coupled to an endpoint, the new hardware will first be detected, and then the endpoint may search for suitable drivers and, where appropriate, present a user inquiry of how the new hardware should be handled. A user may then apply a file system to view contents of the USB device and select a file to open or execute as desired, or an autorun.exe or similar file may be present on the USB device that begins to execute automatically when the USB device is inserted. All of these operations may require multiple operating system calls, file system accesses, hardware abstraction layer interaction, and so forth, all of which may be discretely represented within the event graph 500, or abstracted up to a single event or object as appropriate. Thus, it will be appreciated that the event graph 500 depicted in the drawing is intended to serve as an illustrative example only, and not to express or imply a particular level of abstraction that is necessary or useful for root cause identification as contemplated herein.

The event graph 500 may be created or analyzed using rules that define one or more relationships between events and computing objects. The C Language Integrated Production System (CLIPS) is a public domain software tool intended for building expert systems, and may be suitably adapted for analysis of a graph such as the event graph 500 to identify patterns and otherwise apply rules for analysis thereof. While other tools and programming environments may also or instead be employed, CLIPS can support a forward and reverse chaining inference engine suitable for a large amount of input data with a relatively small set of inference rules. Using CLIPS, a feed of new data can trigger a new inference, which may be suitable for dynamic solutions to root cause investigations.

An event graph such as the event graph 500 shown in the figure may include any number of nodes and edges, where computing objects are represented by nodes and events are represented by edges that mark the causal or otherwise directional relationships between computing objects such as data flows, control flows, network flows and so forth. While processes or files are common forms of nodes that might appear in such a graph, any other computing object such as an IP address, a registry key, a domain name, a uniform resource locator, a command line input or other object may also or instead be designated to be a node in an event graph as contemplated herein. Similarly, while an edge may be formed by an IP connection, a file read, a file write, a process invocation (parent, child, etc.), a process path, a thread injection, a registry write, a domain name service query, a uniform resource locator access and so forth other edges may be designated. As described above, when a security event is detected, the source of the security event may serve as a starting point within the event graph 500, which may then be traversed backward to identify a root cause using any number of suitable cause identification rules. The event graph 500 may then usefully be traversed forward from that root cause to identify other computing objects that are potentially tainted by the root cause so that a more complete remediation can be performed.

Using the systems and methods described herein may provide for advantageous sandboxing techniques. For example, the sequence of events included in a data recorder or event graph may be executed within a sandbox or the like in a similar manner as the sequence of events occurred on the endpoint where a security event was detected. This may be accomplished without replicating the entire action sequence of events on the endpoint, e.g., using only a predetermined time window or a predetermined sequence of events. In this manner, information from the data recorder may be used to replicate the actual order of events and processes that were involved in a security event. This may increase the likelihood of a sample detonating in a useful manner for analyses.

Figure 6:
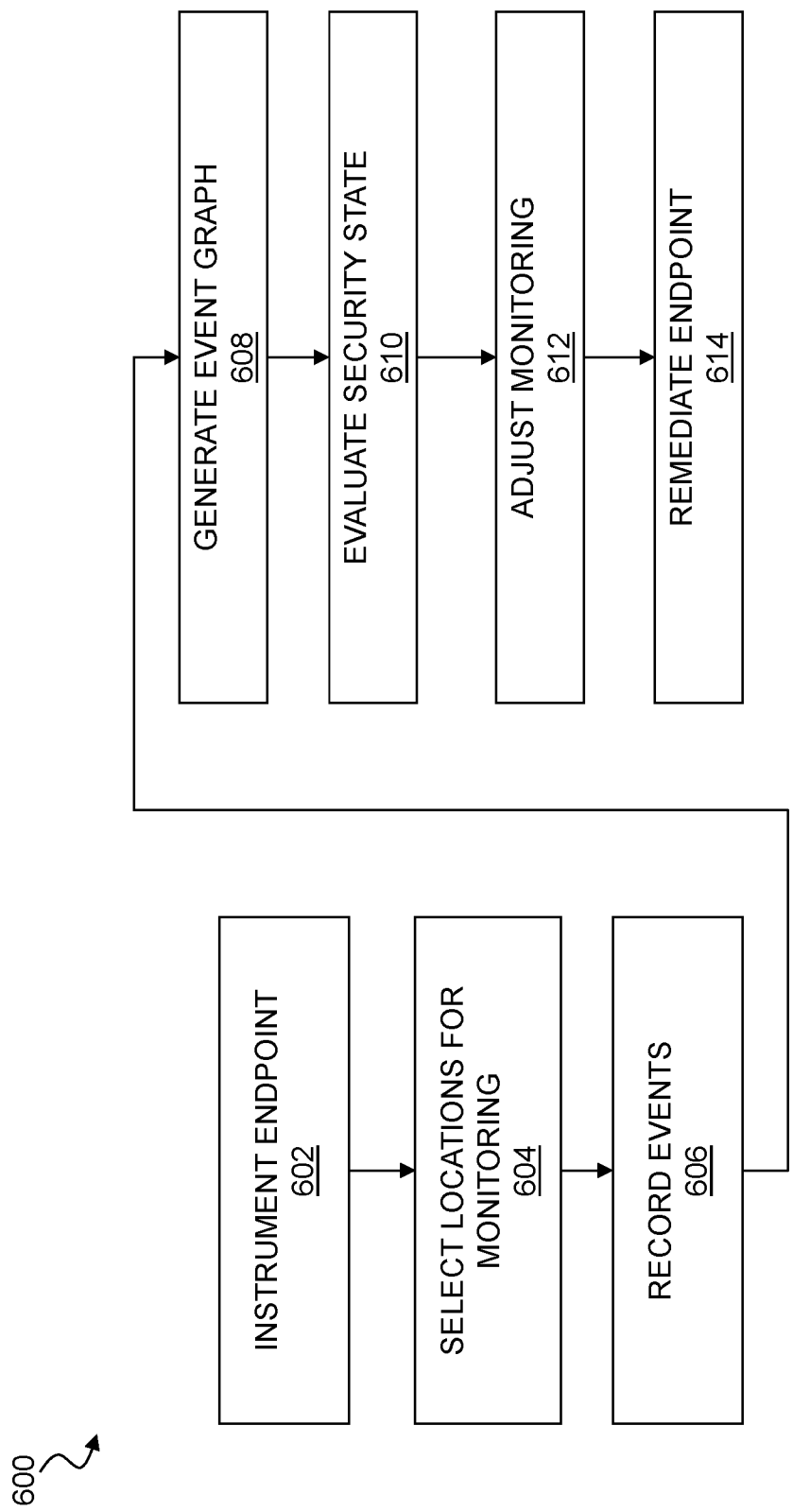
FIG. 6 shows a method for malware detection using an event graph.

FIG. 6 shows a method for malware detection using an event graph. Once a root cause has been identified as described above, the event graph proximal to the root cause can be used to detect malware based on the emergence of a similar or identical event graph during malware monitoring. This potentially facilitates earlier detection by permitting detection based on the root cause pattern rather than the (subsequent) beacon that initially triggered the search for a root cause during forensic analysis. In addition, monitoring may be adapted to a current security context, e.g., by adding more monitoring points or decreasing filtering (e.g., to gather more data at each point) when the security state worsens or there is a perceived increase in security risk. In general, the computing objects, events, event graph, and the like described below may be any of those described above with respect to root cause identification, with the characteristics of the root cause applied for prospective malware detection instead of or in addition to retroactive, forensic root cause analysis.

As shown in step 602, the method 600 may include instrumenting an endpoint to monitor a number of causal relationships among computing objects at a plurality of logical locations within a computing environment related to the endpoint. Instrumentation may use any suitable techniques for recording data as contemplated herein. The computing objects may in general be any hardware or software computing object such as a data file, a database record, a database, a directory, a file system, a file system path, a process, an application, an operating system, a registry or registry entry, a network address, a network path, a peripheral device, a physical device (e.g., a disk drive, optical drive, communications or network interface, keyboard, mouse, sensor, camera, microphone, etc.), and so forth. In general, the logical locations may be any corresponding locations of diagnostic interest that might be accessed or used by the computing objects within the computing environment, such as hardware/device interfaces, device drivers, a file system and/or directory, memory (e.g., RAM, cache, processor registers), operating system interfaces, application programming interfaces, network communication ports or interfaces, and any data sources of interest such as credential stores, system registries, system configuration files, and so forth. In one aspect, this may include logical locations separate from the endpoint, such as locations on a second physical endpoint separate from the first endpoint, or a web site, file server, mail server, or other remote resource. By extending instrumentation beyond the individual endpoint, malicious software movements can be tracked throughout a network or from one device to another in order to improve malware detections and the like. The logical locations may also or instead include a programmatic interface to a human interface device such as a mouse, keyboard, sensor, camera, microphone, or other input/output device. The logical locations may also or instead include peripherals or other devices attached to and communicating with the endpoint such as USB memory devices, flash drives, and so forth.

Monitoring may be performed at various levels of granularity. For example, monitoring may include monitoring of specific memory locations or file locations that are potentially of interest, such as by monitoring reads and/or writes to specific file names, specific directories, and so forth. In another aspect, the instrumentation may be configured for variable monitoring. For example, where a high-risk state is detected, filtering may be decreased so that, e.g., a file system or other resource is monitored more aggressively and additional events are captured. This heightened monitoring may be continued for a predetermined window, or until the high-risk state has passed, or indefinitely or until the occurrence of some specific event.

More generally, the instrumentation contemplated herein may include any instrumentation suitable for monitoring causal relationships among computing objects at logical locations within a computing environment for an endpoint. The computing environment may be confined to the computing environment on a particular endpoint such as the hardware and software associated with that endpoint. The computing environment may more generally include any computing environment related to the endpoint, and may be extended to include other endpoints, remote computing resources such as websites, web servers, file servers, devices such as printers, copiers, watches, televisions, appliances, and so forth. More generally, any other location or resource that might provide logical locations useful for monitoring and diagnostic purposes may be included in the computing environment. In one aspect, this may include other endpoints within a local area network or enterprise network used by the endpoint, such as where another endpoint in the enterprise network sends commands or data to the endpoint or receives commands or data from the endpoint. In general, the instrumentation may include predetermined instrumentation of specific logical locations. That is, the endpoint may be configured to provide causal information from specific logical locations, any of which may then be controllably selected for observation after an initial configuration. In another aspect, instrumentation may include dynamic instrumentation that is deployed as needed or desired for endpoint monitoring. Thus, for example, where a new registry entry is created or a new file is downloaded, that computing object may be monitored prospectively as a new logical location on the endpoint until it can be determined that the new computing object is safe.

As shown in step 604, the method 600 may include selecting a set of logical locations from the plurality of logical locations. This may include adding one or more of the plurality of logical locations to the first set of logical locations in response to a detected increase in security risk. This may also or instead include removing one of the plurality of logical locations from the first set of logical locations in response to a detected decrease in security risk. More generally, this may include adapting the monitored locations according to a security state of the endpoint so that more or less computing resources can be used as necessary or appropriate according to the current state of risk.

In another aspect, selecting logical locations may include adapting the monitoring based on observed properties of objects within a computing environment. For example, computing objects such as files or processes may be explicitly labelled with information about reputation, exposure to external networks, usage history, security status, and so forth. One useful system for labeling objects in this manner is described by way of example in commonly-owned U.S. application Ser. No. 15/179,547, entitled "Network Security" and filed on Jun. 10, 2016, the entire content of which is hereby incorporated by reference. Without limiting the generality of that disclosure, numerous techniques are described for labeling processes, files, and other computing objects with useful information for malware detection, reputation-based processing, and so forth. These and other techniques may be usefully employed to label computing objects in any manner useful for evaluating a security state of an endpoint (or specific computing objects on the endpoint), and for using this security state to adapt the monitoring processes contemplated herein.

For example, each file, process, or other object may be labelled according to whether the object has been exposed to an external network or resource. In this manner, objects that have remained isolated on the endpoint can be distinguished from objects that have been exposed outside of the endpoint (and that are thus potentially at risk for infection or other malicious activity). Where exposure of computing objects is explicitly tracked, selecting a set of logical locations may include selecting a group from the plurality of logical locations based on exposure to an external environment, e.g., where the exposure implies a greater degree of security risk. Similarly, these techniques may be used to label computing objects according to reputation, which permits the use of a local or remotely managed reputation database to label computing objects according to their own inherent reputation (e.g., good, bad, low, unknown, etc.) or according to the reputation of other computing objects that a computing object has been exposed to, or some combination of these. In this case, selecting a set of logical locations may include selecting a group from the plurality of logical locations based on a reputation, such as a reputation of one of the computing objects, or a reputation of a group of computing objects. In general, reputation-based evaluations may be done at any suitable level of granularity or complexity. For example, where a known and good reputation process is being used, the selection may include excluding one of the plurality of logical locations associated with the known, good process. This may also or instead include adding locations associated with processes of unknown reputation, or increasing the number of locations or level of monitoring when an inconsistency is detected between a reputation of a first process and a reputation of a second process calling or invoking the first process. More generally, where reputation information is available for computing objects on an endpoint, any inconsistencies between reputations of computing objects that are causally linked in an event graph, or any other reputation information that might be available for the computing objects, may be usefully employed to adapt monitoring as contemplated herein.

The reputation of computing objects may include a score (or other label, indication, weighting, and the like) of one or more of its prevalence, its provenance, and its pedigree. The prevalence of a computing object may include how the computing object has been seen on other machines or systems. The provenance of a computing object may include its origin, e.g., where it came from, who created or signed it, and the like. The pedigree of a computing object may allow for identification of the creator of the computing object. For example, the pedigree may be based on the public key of the certificate that signed software (e.g., typically the first intermediate certificate). For URLs, this may be based on the signed SSL server certificate. For software, this may be based on the signed packet that contains the software (if present). Providence and prevalence may be uncovered by checking on the public key of the certificate in question, and known good computing objects (or reputations or attributes thereof, e.g., certificates) may be hard coded into a list for future lookup.

As shown in step 606, the method 600 may include recording a sequence of events causally relating the number of computing objects at the set of logical locations selected in step 604. In general, this may include recording any of the events described herein. This may also or instead include filtering the recorded events more or less aggressively according to a security state or other information. For example, this may include filtering one or more of the events in the sequence of events according to a reputation, such as by excluding events that are related to a known good process, or increasing data collection or sensitivity for events that are related to unknown or low reputation computing objects.

In one aspect, some or all of the events may have an aging or duration parameter such as a time to live. This permits appropriate aging of events according to their short-term or long-term diagnostic significance. For example, in lateral movement malware exploit, one endpoint may try to log in to another endpoint using a series of login attempts with different credentials. To detect this type of attempted lateral movement, it may be useful to retain all login attempts for a relatively short period of time in order to see if a number of similar login attempts occur within a short time period. However, after the passage of some time, any such failed login attempts might be discounted in significance, and aged out of the current event graph using a suitable time to live or other time constant. Thus, a number of events within the sequence of events may be preserved for a predetermined time window. The predetermined time window may have a different duration for at least two of the types of computing objects contemplated herein, which may be useful where events for different computing objects (e.g., remote resources, local files, processes, and the like) provide information with differing long-term or short-term value.

As shown in step 608, the method 600 may include creating an event graph based on the sequence of events. The event graph may be continuously created and updated by a data recorder—that is, the data recorder may store the event graph as its native data logging format—or the event graph may be created on demand from a structured or unstructured data log at discrete moments, e.g., in response to a request for an event graph from the data recorder. Thus, in one aspect, the data recorder may function to continuously obtain data from a variety of sources or locations in addition to the locations that have been selected for monitoring. While this additional data logging may require additional computing resources to capture information beyond selecting monitoring points as well as additional storage, the additional data may also advantageously permit retroactive reconstruction of malicious causal chains if potential malware has been detected. Thus, in one aspect, a data recorder may record additional data from instrumentation points outside the scope of the logical locations that are currently explicitly being monitored. The data recorder may have a prioritized list of logical locations, and may record additional data based on the prioritized list of logical locations.

As described herein, the event graph may generally associate a number of computing objects to one another through events that establish causal relationships. In general, the causal relationships may include a data flow, a control flow, or a network flow, or any other type of event or the like that causally relates one computing object to other computing objects within an endpoint computing environment.

As shown in step 610, the method may include evaluating a security state of the endpoint. In one aspect, this may include evaluating the security state of the endpoint based on the event graph, such as by applying a malware detection rule to the event graph. This may provide useful diagnostic information by comparing the current event graph to one or more graphs for root causes that have been identified as described above, or by comparing the current event graph to other patterns of events that show a causal relationship among computing objects that is suggestive or indicative of malicious activity.

It will be appreciated that other techniques may also or instead be employed to evaluate the security state of the endpoint, such as signature-based malware detection, behavioral malware detection, or any other techniques known in the art to be useful for detecting the presence of malware on an endpoint. These techniques may provide additional information that may be useful for a general evaluation of the security state of the endpoint, which may be used instead of or in addition to event-based techniques to evaluate the security state of an endpoint and to inform other event-based monitoring steps.

As shown in step 612, the method 600 may include adjusting the set of logical locations according to the security state of the endpoint. In general, this may include adding a new logical location or removing an existing logical location. Thus, this may generally include selecting a second set of logical locations different from the first plurality of logical locations in response to an observed event graph for the sequence of events. This may also or instead include changing a level of filtering at one of the set of logical locations according to the security state of the endpoint. In another aspect, any of the selection criteria described above for use with an initial selection of monitoring locations (e.g., in step 604) may also or instead be employed as criteria for adding, removing, or filtering logical locations in order to adjust the monitoring in response to a security state. It will also be understood that, while the event graph may generally provide useful information about the security state of the endpoint, other information may also or instead be used to evaluate the security state and modify the monitoring process accordingly. For example, the monitoring may be adjusted based on a detection of malware obtained from another source such as an antivirus scanner or the like, or the monitoring may be adjusted based on exposure to external resources, reputation information, or any other information that might be available for processes, files, and the like as contemplated herein.

As shown in step 614, the method 600 may include remediating the endpoint when the security state is compromised, for example, when a combination of a malware detection rule and the event graph indicate a compromised security state. This may include any suitable form of remediation. For example, where evaluating the security state includes identifying one of the computing objects (or a group of the computing objects) as a cause of a compromised security state, the method 600 may include remediating that one of the computing objects. Remediation may also or instead include traversing the event graph forward from the cause to identify one or more other ones of the computer objects affected by the cause, any of which may be similarly remediated.

Numerous remediation techniques are known in the art and may be usefully employed to remediate an endpoint, or one or more computing objects on an endpoint, as contemplated herein. This may for example include quarantining or isolating the endpoint to prevent interactions with other devices on a network. This may also or instead include deploying malware removal tools to the endpoint, or launching a malware removal tool that is already on the endpoint, to remove malware that has been detected. This may also include intermediate steps such as terminating processes, deleting logs, clearing caches, or any other steps or combination of steps suitable for removing malicious software from the endpoint and/or restoring the endpoint to an uninfected state. This may include notifying an administrator or user. This may include reporting a health state that indicates compromise, for example, as part of a heartbeat health report.

According to the foregoing, there is also contemplated herein an endpoint that uses an adaptive event graph for malware detection. In general, the endpoint may include a network interface, a memory, and a processor. The processor may be configured by computer executable code stored in the memory to detect malware by performing the steps of instrumenting the endpoint to monitor a number of causal relationships among a number of computing objects at a plurality of logical locations within a computing environment related to the endpoint, selecting a first set of logical locations from the plurality of logical locations, recording a sequence of events causally relating the number of computing objects at the first set of logical locations, creating an event graph based on the sequence of events, applying a malware detection rule to the event graph, and remediating the endpoint when the malware detection rule and the event graph indicate a compromised security state. The processor may be further configured to adjust the set of logical locations by adding a new logical location, removing an existing logical location, or changing a level of filtering at one of the set of logical locations according to a security state of the endpoint.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for detecting malware on an endpoint in an enterprise network, the computer program product comprising computer executable code embodied in a non-transitory computer readable medium that, when executing on the endpoint, performs the steps of:
   instrumenting the endpoint to monitor a number of causal relationships among a number of computing objects at a plurality of logical locations within a computing environment related to the endpoint;
   selecting a set of logical locations from the plurality of logical locations, the set of logical locations excluding at least one logical location of the plurality of logical locations associated with a known, good process;
   recording a sequence of events causally relating the number of computing objects at the set of logical locations;
   creating an event graph based on the sequence of events;
   applying a malware detection rule to the event graph; and
   remediating the endpoint when the malware detection rule and the event graph indicate a compromised security state.

2. The computer program product of claim 1, wherein selecting the set of logical locations includes selecting a group of logical locations from the plurality of logical locations based on exposure to an external environment.

3. The computer program product of claim 1, wherein selecting the set of logical locations includes selecting a group of logical locations from the plurality of logical locations based on reputation.

4. The computer program product of claim 1, wherein selecting the set of logical locations includes increasing a number of logical locations in the set of logical locations based on an inconsistency between a reputation of a first process and a reputation of a second process calling the first process.

5. A method for malware detection comprising:
   instrumenting a first endpoint to monitor a number of causal relationships among a number of computing objects at a first set of logical locations within a computing environment related to the first endpoint;
   excluding, from the first set of logical locations, at least one logical location associated with a known, good process;
   recording a sequence of events causally relating the number of computing objects at the first set of logical locations excluding the at least one logical location associated with the known, good process;
   creating an event graph based on the sequence of events;
   applying a malware detection rule to the event graph; and
   remediating the first endpoint when the malware detection rule and the event graph indicate a compromised security state.

6. The method of claim 5, wherein the first set of logical locations includes logical locations associated with processes of unknown reputation.

7. The method of claim 5, further comprising adding one or more logical locations to the first set of logical locations in response to a detected increase in security risk.

8. The method of claim 5, further comprising removing a logical location from the first set of logical locations in response to a detected decrease in security risk.

9. The method of claim 5, further comprising filtering one or more of the events in the sequence of events according to reputation.

10. The method of claim 5, wherein the first set of logical locations includes at least one endpoint separate from the first endpoint.

11. The method of claim 5, wherein the first set of logical locations includes at least one programming interface to a human interface device.

12. The method of claim 5, further comprising identifying one of the number of computing objects as a cause of the compromised security state and remediating the one of the number of computing objects.

13. The method of claim 5, wherein the number of causal relationships include a data flow.

14. The method of claim 5, wherein the number of causal relationships include a control flow.

15. The method of claim 5, wherein the number of causal relationships include a network flow.

16. The method of claim 5, wherein the one or more computing objects include one or more types of computing objects selected from a group consisting of a data file, a process, an application, a registry entry, a network address, and a peripheral device.

17. The method of claim 5, wherein a number of events within the sequence of events are preserved for a predetermined time window, and further wherein the predetermined time window has a different duration for at least two different types of computing objects.

18. An endpoint comprising:
   a network interface;
   a memory; and
   a processor configured by computer executable code stored in the memory to detect malware by performing the steps of instrumenting the endpoint to monitor a number of causal relationships among a number of computing objects at a set of logical locations within a computing environment related to the endpoint, excluding, from the set of logical locations, at least one logical location of the set of logical locations associated with a known, good process, recording a sequence of events causally relating the number of computing objects at the set of logical locations excluding the at least one logical location of the set of logical locations associated with the known, good process, creating an event graph based on the sequence of events, applying a malware detection rule to the event graph, and remediating the endpoint when the malware detection rule and the event graph indicate a compromised security state.

19. The endpoint of claim 18, wherein the processor is further configured to adjust the set of logical locations by adding a new logical location, removing an existing logical location, or changing a level of filtering at one of the set of logical locations according to a security state of the endpoint.

20. The endpoint of claim 18, wherein the number of causal relationships include one or more of a data flow, a control flow, and a network flow.

* * * * *